United States Patent
Chou

(10) Patent No.: US 9,303,657 B2
(45) Date of Patent: Apr. 5, 2016

(54) FAN AND MOTOR BEARING HEAT DISSIPATION STRUCTURE THEREOF

(71) Applicant: ASIA VITAL COMPONENTS CO., LTD., New Taipei (TW)

(72) Inventor: Chu-Hsien Chou, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 679 days.

(21) Appl. No.: 13/723,098

(22) Filed: Dec. 20, 2012

(65) Prior Publication Data

US 2014/0178184 A1 Jun. 26, 2014

(51) Int. Cl.
| | |
|---|---|
| *F04D 29/056* | (2006.01) |
| *F04D 29/58* | (2006.01) |
| *F04D 25/06* | (2006.01) |
| *F04D 25/08* | (2006.01) |
| *F04D 29/046* | (2006.01) |
| *F04D 29/057* | (2006.01) |
| *H02K 5/167* | (2006.01) |
| *H02K 9/22* | (2006.01) |

(52) U.S. Cl.
CPC .......... *F04D 29/5806* (2013.01); *F04D 25/062* (2013.01); *F04D 25/064* (2013.01); *F04D 25/08* (2013.01); *F04D 29/046* (2013.01); *F04D 29/057* (2013.01); *F04D 29/584* (2013.01); *H02K 5/1677* (2013.01); *H02K 9/22* (2013.01); *F05D 2240/50* (2013.01)

(58) Field of Classification Search
CPC . F04D 25/062; F04D 25/064; F04D 25/0646; F04D 25/08; F04D 29/046; F04D 29/049; F04D 29/58; F05D 2240/50; H02K 9/22
USPC .......................................... 384/476; 361/695
See application file for complete search history.

(56) References Cited

U.S. PATENT DOCUMENTS

| | | | | |
|---|---|---|---|---|
| 6,246,140 | B1 * | 6/2001 | Horng | H02K 1/187 310/40 MM |
| 7,364,403 | B2 * | 4/2008 | Wu | F04D 29/063 384/114 |
| 7,567,003 | B2 * | 7/2009 | Hong | F04D 29/056 310/67 R |
| 2007/0286725 | A1 * | 12/2007 | Su | F04D 29/601 415/213.1 |
| 2008/0063527 | A1 * | 3/2008 | Yeh | F04D 29/646 416/174 |

* cited by examiner

*Primary Examiner* — Ninh H Nguyen

(57) ABSTRACT

A motor bearing heat dissipation structure includes a metal base, a heat conducting element connected to the metal base and including a wall portion and an extended portion, and a plastic bearing cup located around an outer side of the wall portion of the heat conducting element and fixed to the metal base. The plastic bearing cup internally defines a bearing receiving hole. The extended portion is horizontally extended from an upper end of the wall portion toward a center of the plastic bearing cup. A bearing is received in the bearing receiving hole and seated on the extended portion, so that heat produced by the bearing when it rotates along with a rotary shaft of a motor is transferred from the extended portion of the heat conducting element to the metal base for dissipation. A fan using such motor bearing heat dissipation structure is also disclosed.

20 Claims, 10 Drawing Sheets

FAN AND MOTOR BEARING HEAT DISSIPATION STRUCTURE THEREOF

FIELD OF THE INVENTION

The present invention relates to a heat dissipation structure, and more particularly, to a motor bearing heat dissipation structure; and the present invention also relates to a fan having such motor bearing heat dissipation structure.

BACKGROUND OF THE INVENTION

Many conventional inventions have disclosed different manners of holding a bearing in a bearing cup. For example, a prior art discloses a motor fixing structure for a fan having a metal bearing cup. The fan includes a frame, a circuit board arranged on the frame, a stator assembly mounted on the frame, and a rotor assembly located around an outer side of the stator assembly. The frame is provided at a central area with a support seat, on which a bearing cup is provided. The bearing cup includes a connection sleeve portion and a hollow tube portion. The connection sleeve portion is provided on an outer wall surface with a plurality of receiving sections. The stator assembly is fixedly provided on a bottom with a lower winding frame, which defines a central through hole. A plurality of latching sections is provided on an inner wall surface of the central through hole for correspondingly engaging with the receiving sections on the bearing cup. In this manner, the stator assembly is stably fitted via the lower winding frame to the bearing cup on the support seat without the risk of loosening or separating from the bearing cup due to any external force or being used over a long time, so as to ensure normal operation of the fan.

Furthermore, a prior art discloses a motor fixing structure for a fan having a non-metal bearing cup. The fan includes a frame, a circuit board arranged on the frame, a stator assembly mounted on the frame, and a rotor assembly located around an outer side of the stator assembly. The frame is provided at a central area with a support seat, on which a bearing cup is provided. The bearing cup includes a connection sleeve portion and a hollow tube portion. The connection sleeve portion is provided on an outer wall surface with a plurality of receiving sections, and the hollow tube portion is provided on an outer wall surface with a plurality of ribs. The stator assembly is fixedly provided on a bottom with a lower winding frame, which defines a central through hole. A plurality of latching sections is provided on an inner wall surface of the central through hole for correspondingly engaging with the receiving sections on the bearing cup. In this manner, the stator assembly is stably fitted via the lower winding frame to the bearing cup on the support seat without the risk of loosening or separating from the bearing cup due to any external force or being used over a long time, so as to ensure normal operation of the fan.

Furthermore, a prior art discloses a fan bearing cup structure. The fan includes a frame, a motor unit and a blade unit. The frame is provided at a central area with a support seat, on which a bearing cup is provided, and the bearing cup is provided on an outer wall surface at proper positions with a plurality of latching units. The motor unit has a central opening fitted around an outer side of the bearing cup. The opening is formed on an inner edge thereof with a plurality of recesses, to which the latching units are correspondingly locked. The blade unit includes a fan hub, a rotary shaft, a plurality of blades, and a magnetic member. The rotary shaft is centered in the fan hub and fitted in the bearing cup, and the magnetic member is mounted to an inner wall of the fan hub corresponding to the motor unit. In this manner, the motor unit can be stably held to the bearing cup without the risk of becoming loosened therefrom to sway or displace laterally while rotating or to move upward and separate from the bearing cup.

Furthermore, a prior art discloses a motor, which includes a shaft tube, a stator seat, and a rotor structure. The shaft tube is provided at an upper end with at least one first receiving section. The stator seat has an inner bushing, and an opening defined at a center of the inner bushing. Via the opening, the stator seat is fitted around the shaft tube. At least one second receiving section is provided on a peripheral edge of the opening at the center of the inner bushing of the stator seat corresponding to the first receiving section on the shaft tube and is welded thereto. The rotor structure includes a rotary shaft axially received in the shaft tube.

In the above-mentioned techniques, the bearings are held in place generally by plastic injection molding or metal press fit. In the case of metal press fit, while the metal bearing cup has relatively high heat conductivity and the bearing received therein can have better heat dissipation efficiency to effectively lower the bearing temperature, a higher manufacturing cost is required. On the other hand, in the case of plastic injection molding, while a lower manufacturing cost is possible, the plastic bearing cup could not transfer the heat produced by the bearing during rotation thereof, so that the bearing has relatively higher temperature because the produced heat thereof could not be easily dissipated from the plastic bearing cup.

It is therefore very important to work out a way for forming a fan at reduced manufacturing cost while enabling efficient removal of heat from the bearing.

SUMMARY OF THE INVENTION

A primary object of the present invention is to provide a fan motor structure, in which a plastic bearing cup encloses a heat conducting element therein and holds the same to a metal base, so as to help in the dissipation of heat produced by a bearing in the plastic bearing cup during motor operation.

Another object of the present invention is to provide a heat conducting element having a wall portion fixedly connected to a metal base and enclosed in a plastic bearing cup, which is also fixed to the metal base.

A further object of the present invention is to provide a plastic bearing cup having an inner wall surface to define a bearing receiving hole therein, a heat conducting element having a wall portion and an extended portion horizontally extended from an upper end of the wall portion beyond the inner wall of the plastic bearing cup toward a center thereof, and a bearing received in the bearing receiving hole and seated on the extended portion of the heat conducting element, so that heat produced by the bearing during rotation thereof is transferred via the extended portion of the heat conducting element to the metal base for dissipation.

A still further object of the present invention is to provide a heat conducting element, which transfers heat produced by a bearing received in a plastic bearing cup to a metal base having a large surface area, so as to enable quick dissipation of heat produced by the bearing during rotation thereof.

A still further object of the present invention is to provide a plastic bearing cup having an inner wall surface to define a bearing receiving hole therein, and a heat conducting element enclosed in the plastic bearing cup and fixedly connected to a metal base; the heat conducting element has an extended portion horizontally extended beyond the inner wall of the plastic bearing cup toward a center thereof, so that a bearing received in the plastic bearing cup is seated on the extended portion. Further, the extended portion of the heat conducting element has a free end extended into and engaged with an annular retaining groove formed around an end of a rotary shaft extended through the bearing, so that the rotary shaft is held to the bearing and the heat produced by the bearing when the same rotates along with the rotary shaft can be transferred to the metal base for dissipation.

To achieve the above and other objects, the present invention provides a motor bearing heat dissipation structure applicable to a bearing having a bottom surface. The motor bearing heat dissipation structure includes a metal base; a heat conducting element, and a plastic bearing cup. The heat conducting element has a wall portion fixedly connected at a lower end to the metal base and an extended portion horizontally formed on an upper end of the wall portion, and the extended portion has a free end and a top surface. The plastic bearing cup includes a lower portion, which encloses the wall portion of the heat conducting element therein and is fixed to the metal base. The plastic bearing cup upward extends from the lower portion and has an upper end located higher than the wall portion. The plastic bearing cup also has an inner wall surface to internally define a bearing receiving hole, which extends from the upper end of the plastic bearing cup into the lower portion thereof. The extended portion of the heat conducting element is extended from the upper end of the wall portion to horizontally radially inward project beyond the inner wall surface of the plastic bearing cup toward a center thereof, so that both the free end and the top surface of the extended portion are located in the bearing receiving hole. The bearing is accommodated in the bearing receiving hole and seated on the extended portion with the bottom surface of the bearing being in contact with the top surface of the extended portion.

According to an embodiment of the present invention, the wall portion of the heat conducting element is configured as a hollow cylinder and is substantially perpendicular to the metal base; and the extended portion of the heat conducting element is horizontally extended from the upper end of the wall portion toward a center of the hollow cylinder.

According to another embodiment of the present invention, the metal base is provided with a through hole, which is located below the heat conducting element and the plastic bearing cup; and a space is defined in the heat conducting element between an underside of the extended portion and an inner side of the wall portion to communicate with the bearing receiving hole and the through hole on the metal base. And, the through hole of the metal base and the space in the heat conducting element a sealing element is correspondingly closed by a sealing element.

According to an embodiment of the present invention, the bearing includes an inner cylindrical portion and an outer cylindrical portion, which together define the bottom surface of the bearing between them, and the free end of the extended portion of the heat conducting element is located at a position corresponding to the inner cylindrical portion.

According to another embodiment of the present invention, the free end of the extended portion of the heat conducting element is located at a position slightly radially inward protruded beyond the inner cylindrical portion to engage with an annular retaining groove formed on a rotary shaft that is received in the inner cylindrical portion.

In the present invention, there is further included a metal bottom plate, on which a first opening is provided; and the metal base is located in the first opening and connected to the metal bottom plate via a plurality of connection arms. The connection arms respectively have an end connected to an outer periphery of the metal base and another opposite end connected to an inner periphery of the first opening, so as to support the metal base in the first opening. The metal bottom plate includes a frame portion extended along an outer edge thereof, such that a second opening is formed on one side of the metal bottom plate between two ends of the frame portion.

According to the present invention, the heat conducting element and the metal bottom plate are made of gold, silver, copper, aluminum or iron, or any combination thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
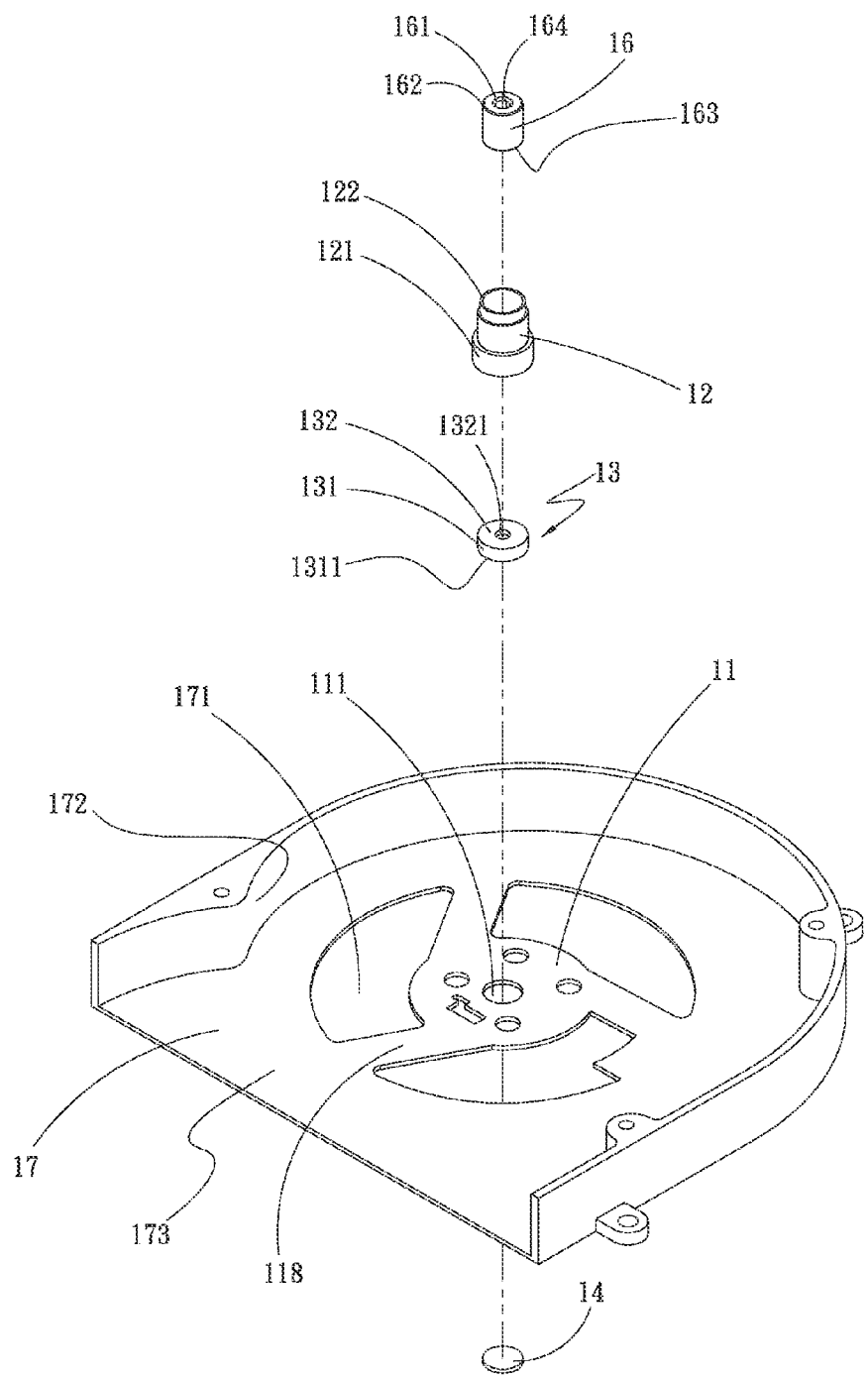
FIG. 1A is an exploded perspective view of a motor bearing heat dissipation structure according to a first preferred embodiment of the present invention, in which a heat conducting element is included.

The present invention will now be described with some preferred embodiments thereof and with reference to the accompanying drawings. For the purpose of easy to understand, elements that are the same in the preferred embodiments are denoted by the same reference numerals.

Figure 1B:
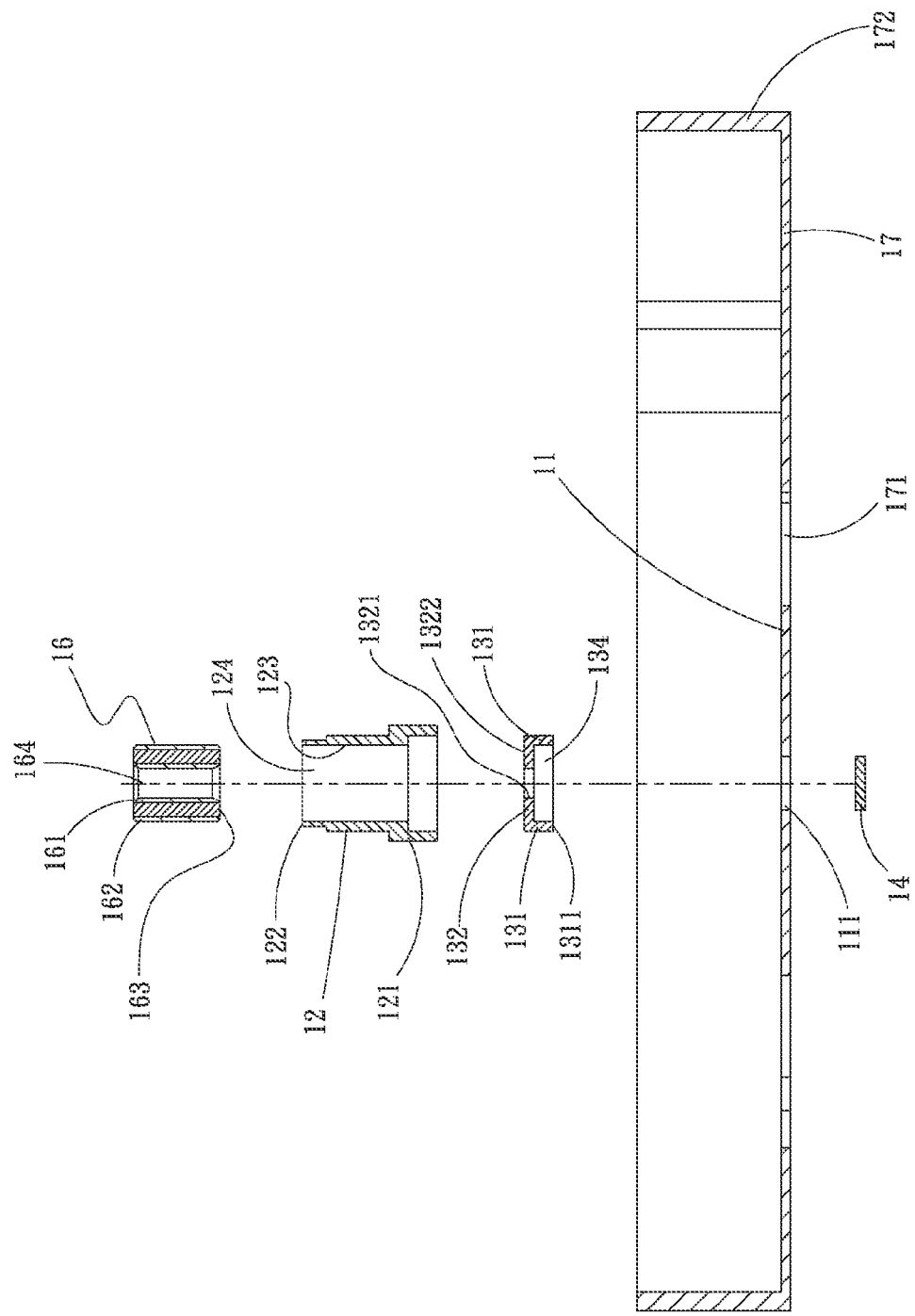
FIG. 1B is a sectional view of FIG. 1A.
Figure 1C:
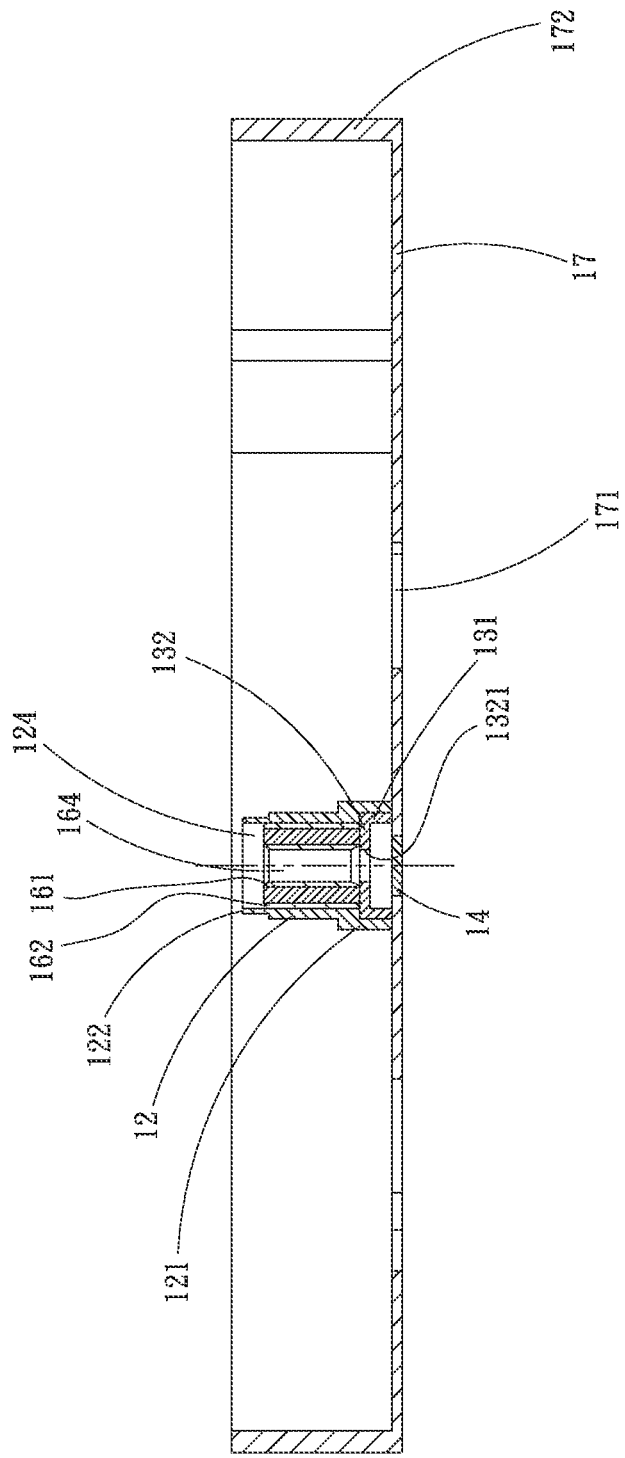
FIG. 1C is an assembled view of FIG. 1B.

Please refer to FIG. 1A that is an exploded perspective view of a motor bearing heat dissipation structure according to a first preferred embodiment of the present invention; and to FIGS. 1B and 1C that are exploded and assembled sectional views, respectively, of the motor bearing heat dissipation structure shown in FIG. 1A. As shown, the motor bearing heat dissipation structure of FIG. 1A includes a metal base 11, a plastic bearing cup 12, and a heat conducting element 13. The metal base 11 has a centered through hole 111 formed thereon. The heat conducting element 13 includes a wall portion 131 and an extended portion 132 horizontally formed on an upper end of the wall portion 131. The wall portion 131 is substantially perpendicular to the metal base 11 and is fixedly connected at a lower end 1311 to the metal base 11, such that the wall portion 131 is located around an outer side of the centered through hole 111.

In an embodiment, the lower end 1311 of the wall portion 131 is welded to the metal base 11. In another embodiment, the metal base 11 is provided with insertion slots or insertion holes, into which the lower end 1311 of the wall portion 131 is correspondingly inserted to connect the heat conducting element 13 to the metal base 11. In a further embodiment, the wall portion 131 and the metal base 11 are correspondingly provided with fixing holes, through which fastening elements can be extended to lock or connect the heat conducting element 13 to the metal base 11. In a still further embodiment, the wall portion 131 is enclosed in the plastic bearing cup 12 and therefore held to the metal base 11.

While the heat conducting element 13 illustrated in the first preferred embodiment of the present invention has a round configuration, it is not limited thereto and can be differently shaped to have, for example, a square, an oblong, a hexagonal, or an octagonal configuration.

The plastic bearing cup 12 includes a lower portion enclosing the wall portion 131 of the heat conducting element 13 therein and being fixed to the metal base 11. The plastic bearing cup 12 upward extends from the lower portion 121 and has an upper end 122 located higher than the wall portion 131. The plastic bearing cup 12 has an inner wall surface 123 and internally defines a bearing receiving hole 124, which extends from the upper end 122 into the lower portion 121. In an embodiment, the plastic bearing cup 12 is injection molded to enclose an outer wall surface of the wall portion 131 and fixedly connect to the metal base 11.

The extended portion 132 of the heat conducting element 13 has a free end 1321 and a top surface 1322. The top surface 1322 is extended between the free end 1321 and the upper end of the wall portion 131 to horizontally radially project beyond the inner wall surface 123 toward a center of the plastic bearing cup 12, so that both the free end 1321 and the top surface 1322 are located in the bearing receiving hole 124. A space 134 is defined between an underside of the extended portion 132 and an inner side of the wall portion 131 to communicate with the bearing receiving hole 124 and the centered through hole 111. The centered through hole 111 can be sealed by a corresponding sealing element 14. According to an embodiment of the present invention, the sealing element 14 is a cap closed onto the centered through hole 111 from a lower side of the metal base 11. According to another embodiment, the plastic bearing cup 12 can be formed on the metal base 11 around the centered through hole 111 by upward injection molding a plastic material from the lower side of the metal base 11 via the centered through hole 111, so as to seal the centered through hole 111 at the same time.

Alternatively, according to a further embodiment, the metal base 11 can be a flat base without a centered through hole. In this case, the sealing element 14 is omitted.

A bearing 16 is received in the bearing receiving hole 124 of the plastic bearing cup 12. The bearing 16 includes an inner cylindrical portion 161 and an outer cylindrical portion 162, which together define a bottom surface 163 of the bearing 16 between them. The inner cylindrical portion 161 internally defines a central bore 164, into which a rotary shaft 223 can be inserted (see FIGS. 3A, 3B, 4 and 5). The bearing 16 accommodated in the bearing receiving hole 124 is seated on the extended portion 132 with the bottom surface 163 being in contact with the top surface 1322. In an embodiment, the free end 1321 of the extended portion 112 is located at a position corresponding to the inner cylindrical portion 161 or between the inner cylindrical portion 161 and the outer cylindrical portion 162. In another embodiment, the free end 1321 is slightly radially protruded into the central bore 164 defined by the inner cylindrical portion 161 to engage with an annular retaining groove formed on the rotary shaft 223 inserted in the central bore 164, as will be described in more details later.

In FIG. 1, there is also shown a metal bottom plate 17, on which a first opening 171 is provided. The metal base 11 is located in the first opening 171 and connected to the metal bottom plate 17 via a plurality of connection arms 118. More specifically, the connection arms 118 respectively have an end connected to an outer periphery of the metal base 11 and another opposite end connected to an inner periphery of the first opening 171, so as to support the metal base 11 in the first opening 171. The metal bottom plate 17 includes a frame portion 172 extended along an outer edge thereof, such that a second opening 173 is formed on one side of the metal bottom plate 17 between two ends of the frame portion 172.

In some embodiments, the metal base 11, the heat conducting element 13, and the metal bottom plate 17 can be made of any one of gold, silver, copper, aluminum, and iron, or any combination thereof.

Figure 2A:
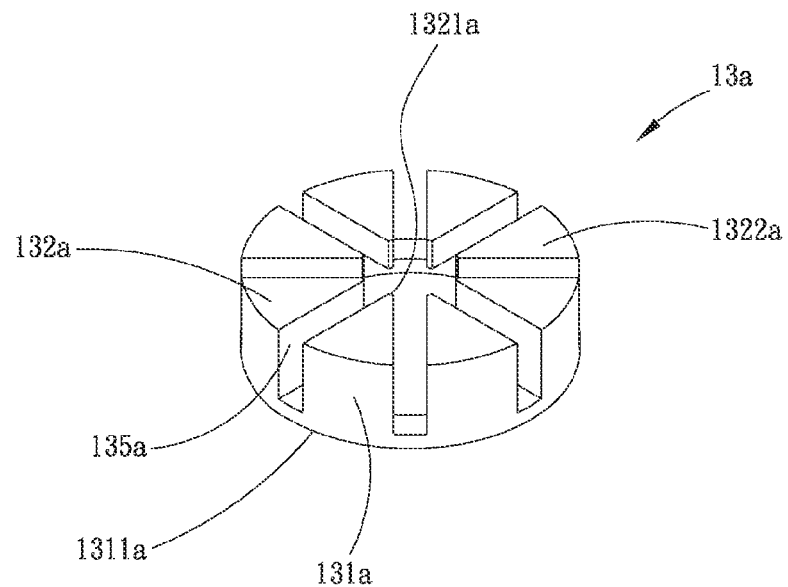
FIG. 2A is a perspective view showing a motor bearing heat dissipation structure according to a second embodiment of the present invention, which has a differently configured heat conducting element.
Figure 2B:
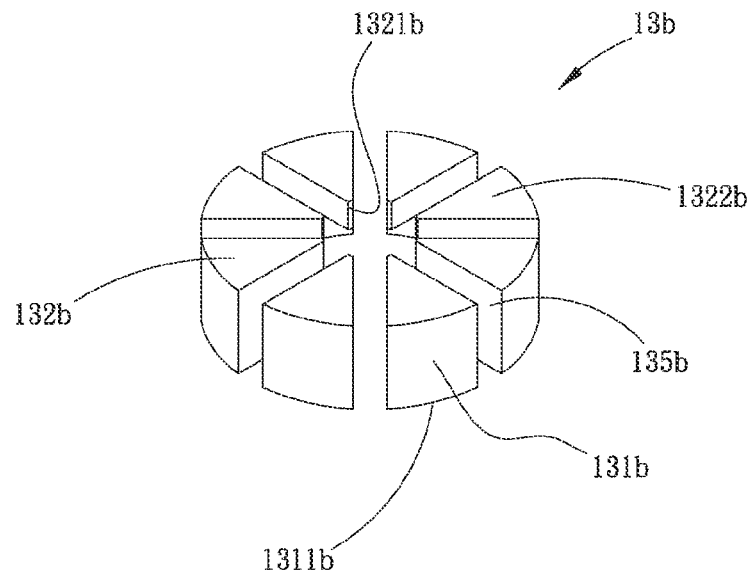
FIG. 2B is a perspective view showing a motor bearing heat dissipation structure according to a third embodiment of the present invention, which has another differently-configured heat conducting element.
Figure 2C:
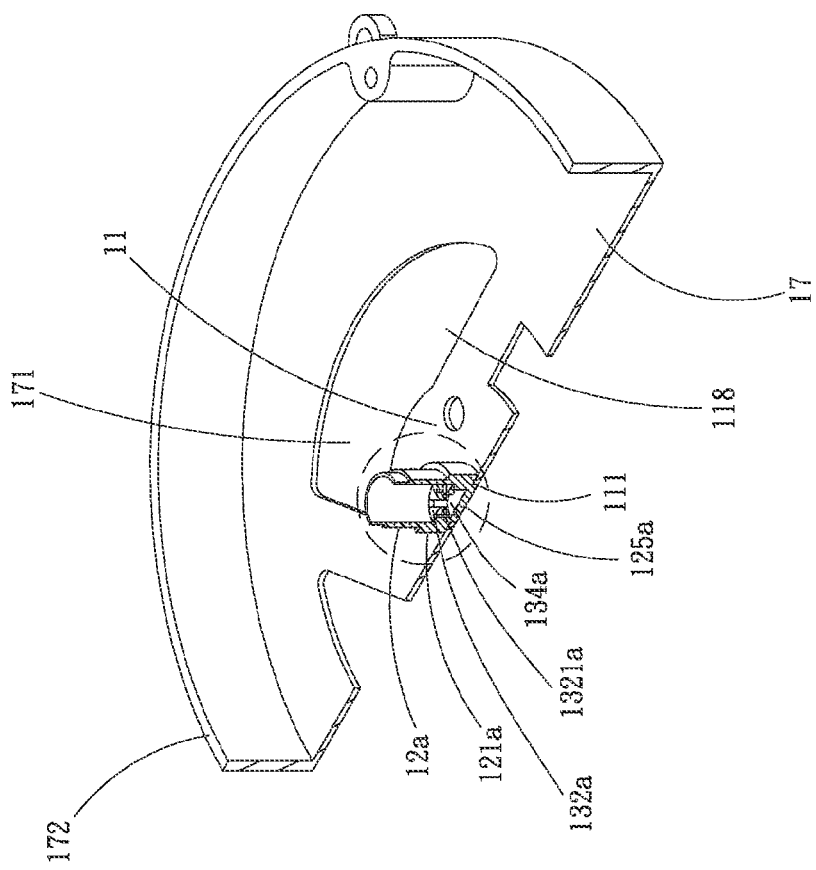
FIG. 2C is a perspective view showing the manner in which the heat conducting element in FIG. 2A is enclosed in a plastic bearing cup.
Figure 2D:
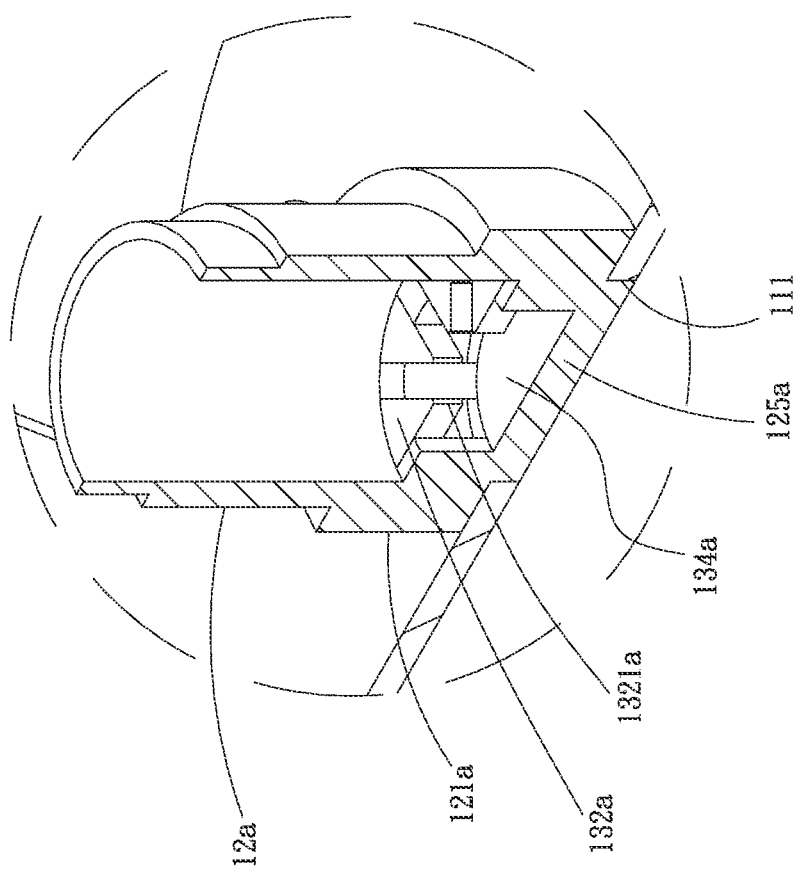
FIG. 2D is an enlarged view of the circled area of FIG. 2C.

In the first preferred embodiment shown in FIGS. 1A to 1C, the heat conducting element 13 is illustrated as having a round wall portion 131 forming a hollow cylinder, and an extended portion 132 horizontally extended toward a center of the hollow cylinder. However, in a motor bearing heat dissipation structure according to a second embodiment of the present invention, a differently configured heat conducting element 13a as shown in FIG. 2A is included. FIG. 2C shows the manner in which the heat conducting element 13a is enclosed in a correspondingly shaped plastic bearing cup 12a, and FIG. 2D is an enlarged view of the circled area of FIG. 2C. As can be seen in FIG. 2A, the heat conducting element 13a includes a wall portion 131a and an extended portion 132a similar to the wall portion 131 and the extended portion 132, and defines a space 134a therein. However, the wall portion 131a is provided with a plurality of circumferentially spaced slots 135a, which do not cut through a lower end 1311a of the wall portion 131a but are respectively extended from the wall portion 131a to the extended portion 132a. The plastic bearing cup 12a has a lower portion 121a partially radially inward extended through the slots 135a into the space 134a above the centered through hole 111, and the lower portion 121a of the plastic bearing cup 12a also forms a sealing end 125a to close the centered through hole 111 and a lower open side of the space 134a. Further, a motor bearing heat dissipation structure according to a third embodiment of the present invention includes another differently configured heat conducting element 13b as shown in FIG. 2B. The heat conducting element 13b includes a wall portion 131b and an extended portion 132b similar to the wall portion 131a and the extended portion 132a. However, the wall portion 131b is provided with a plurality of circumferentially spaced slots 135b, which cut through a lower end 1311b of the wall portion 131b and are respectively extended from the wall portion 131b to the extended portion 132b, so that the heat conducting element 13b is actually formed from a plurality of segments.

Figure 3A:
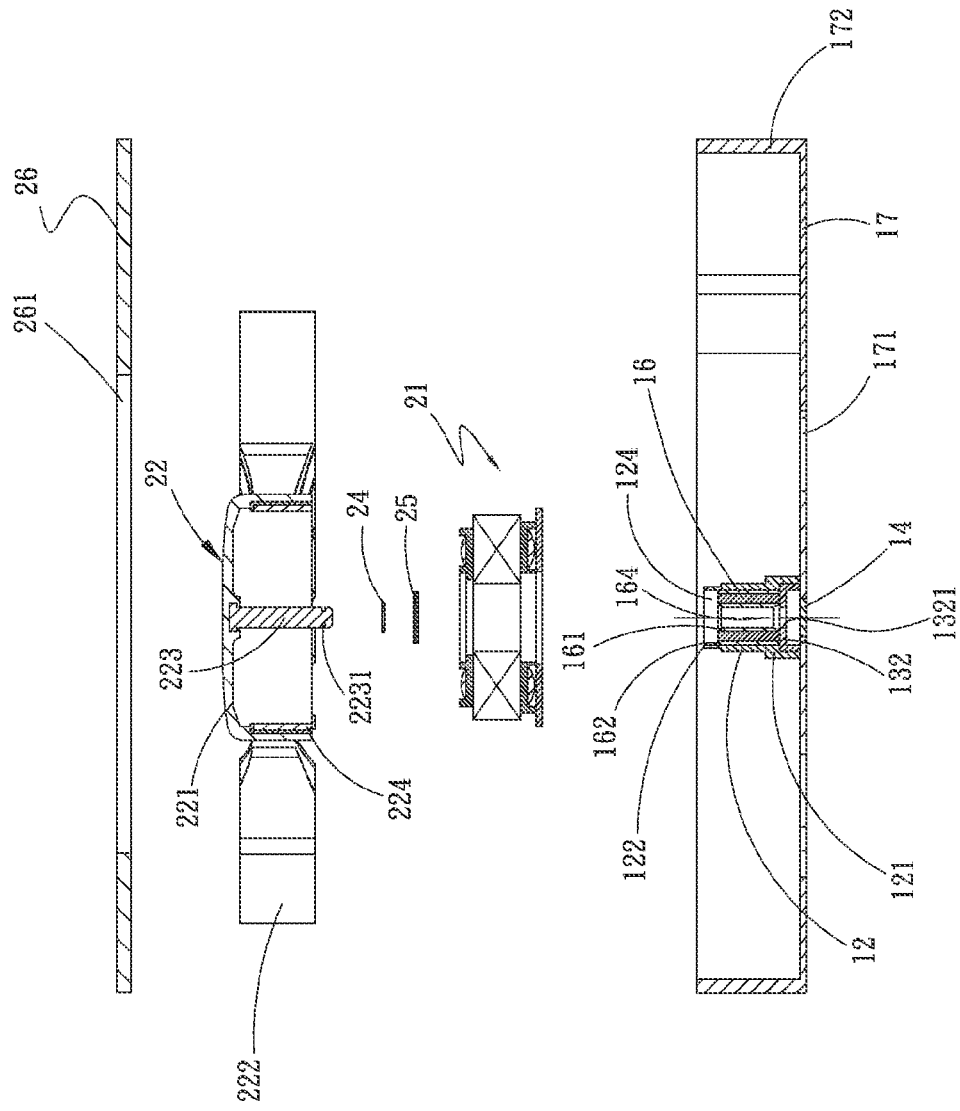
FIG. 3A is an exploded sectional view of a first embodiment of a fan according to the present invention, which uses the motor bearing heat dissipation structure as shown in FIGS. 1A, 2A and 2B.
Figure 3B:
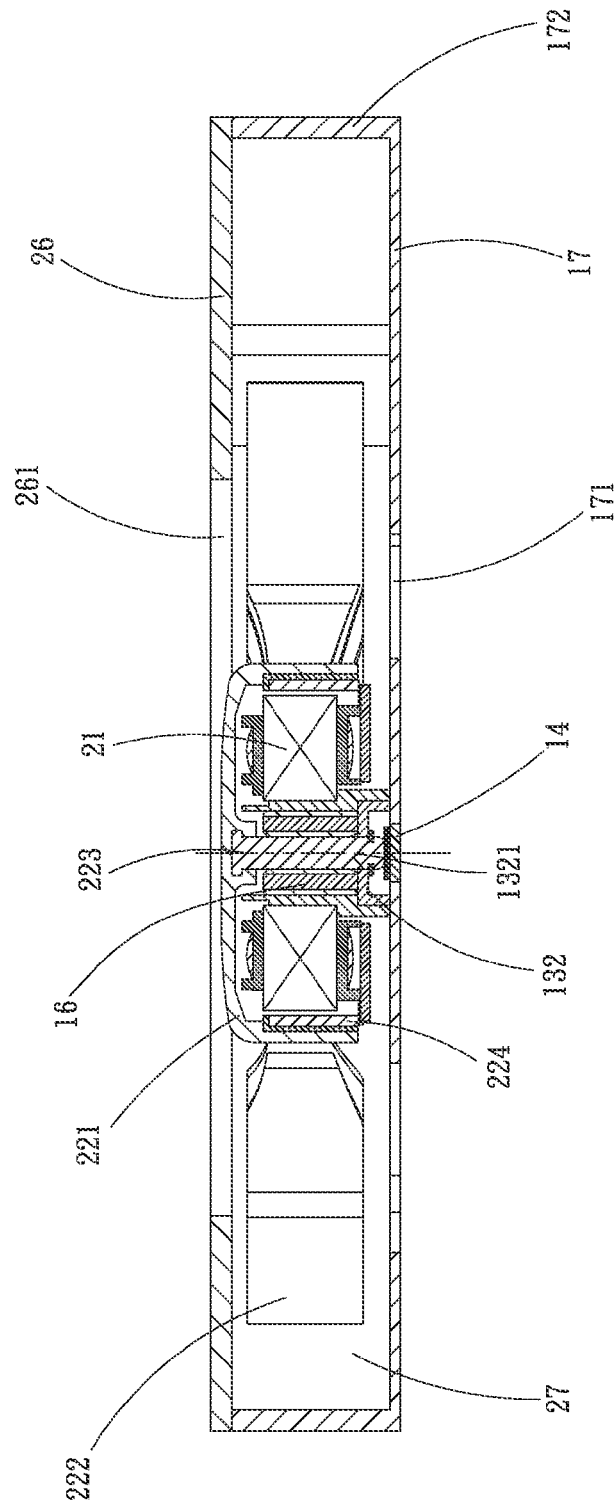
FIG. 3B is an assembled view of FIG. 3A.

The present invention also provides a fan 20 using the motor bearing heat dissipation structure according to the present invention. FIGS. 3A and 3B are exploded and assembled sectional views, respectively, of a first embodiment of the fan 20, which includes, in addition to the above-described motor bearing heat dissipation structure, a stator assembly 21 and a rotor assembly 22. Since the motor bearing heat dissipation structure has been described in details above, it is not repeatedly discussed below.

The stator assembly 21 is fitted on around an outer side of the plastic bearing cup 12, and includes a plurality of silicon steel plates, insulation frames and windings, as well as a circuit board.

The rotor assembly 22 includes a fan hub 221 and a plurality of fan blades 222 circumferentially spaced on an outer side of the fan hub 221. The fan hub 221 is internally provided at a center with a rearward extended rotary shaft 223, which extends through the central bore 164 of the bearing 16. An end of the rotary shaft 223 that extends through the bearing 16 is provided with an annular retaining groove 2231 for a retaining ring 24 to set therein. The retaining ring 24 set in the annular retaining groove 2231 is upward pressed against the underside of the extended portion 132 to prevent the rotary shaft 223 from separating from the bearing 16. A magnetic element 224 is arranged on around an inner wall surface of the fan hub 221 corresponding to the stator assembly 21. The rotor assembly 22 can be an axial fan blade assembly or a centrifugal fan blade assembly.

A pad 25 can be provided on a top of the sealing element 14, so that the end of the rotary shaft 223 extended through the bearing 16 is pressed against the pad 25.

A top cover 26 having a third opening 261 is correspondingly closed onto the frame portion 172 of the metal bottom plate 17, so that a receiving space 27 is defined between the top cover 26, the metal bottom plate 17 and the frame portion 172. The third opening 261 and the first and second openings 171, 172 (see FIG. 1A) are communicable with the receiving space 27.

When the stator assembly 21 is supplied with an amount of current and becomes excited, it drives the rotor assembly 22 to rotate. At this point, the inner cylinder 161 of the bearing 16 rotates along with the rotary shaft 223. Heat produced by the bearing 16 when the inner cylinder 161 rotates is transferred to the metal base 11 and the metal bottom plate 17 via the extended portion 132 of the heat conducting element 13 to achieve the effect of heat dissipation, so as to protect the bearing 16 against damage due to overheating.

Figure 4:
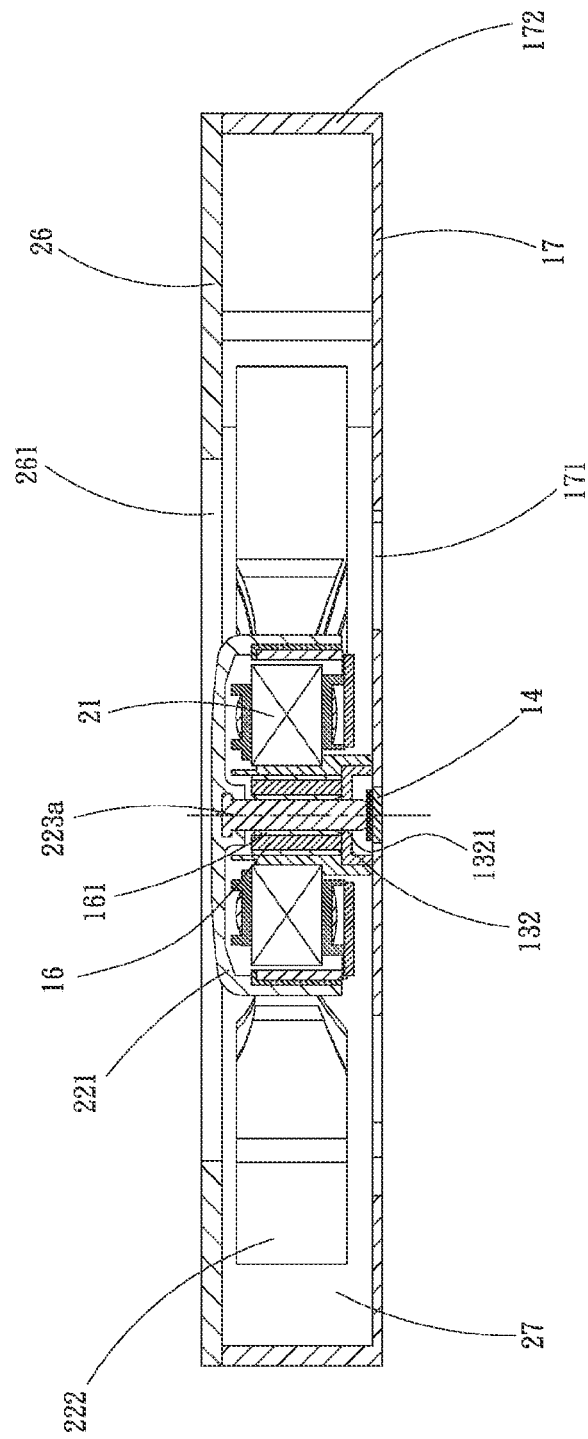
FIG. 4 is an assembled view showing a second embodiment of the fan according to the present invention, which includes a rotary shaft without using any retaining element.

FIG. 4 is an assembled sectional view of a second embodiment of the fan 20, in which an end of a rotary shaft 223a thereof extended through the bearing 16 and the heat conducting element 13 is not provided with any annular groove, so that the retaining ring 24 in the first embodiment is omitted from the second embodiment.

Figure 5:
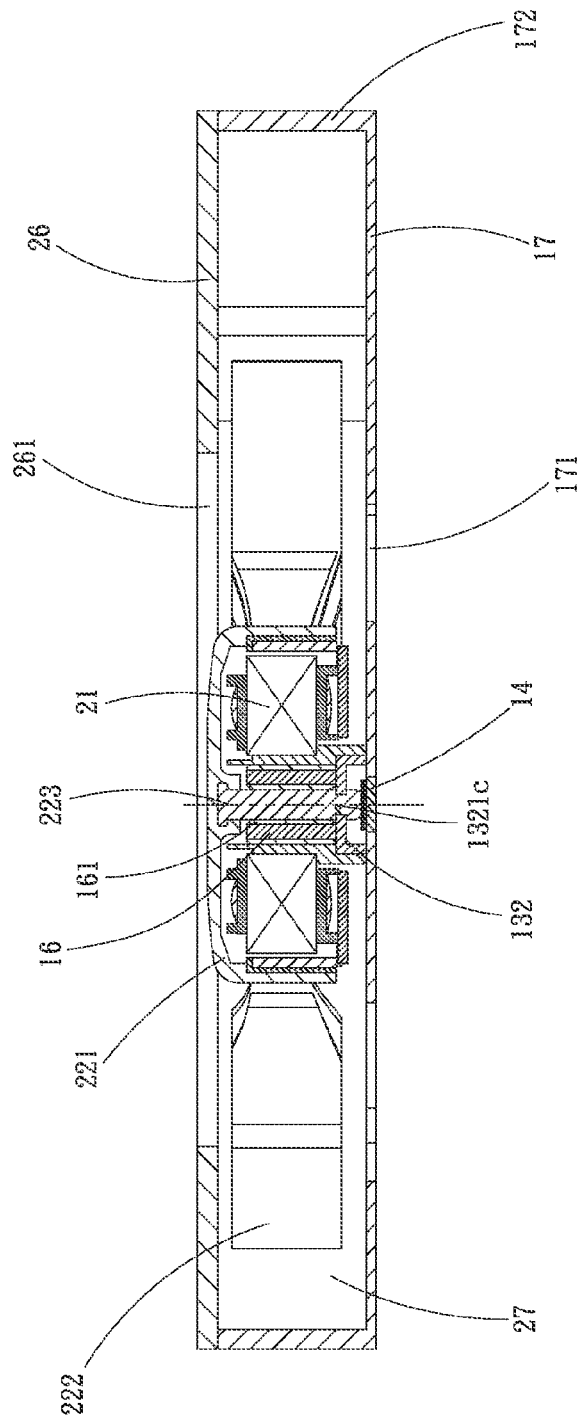
FIG. 5 is another assembled view showing a third embodiment of the fan according to the present invention.

FIG. 5 is an assembled sectional view of a third embodiment of the fan 20, in which the extended portion 132 of the heat conducting element 13 has a free end 1321c slightly radially inward extended beyond the inner cylinder 161 to engage with the annular retaining groove 2231 provided on the rotary shaft 231. Therefore, the heat conducting element 13 in the third embodiment of the fan 20 not only helps in dissipating heat from the bearing 16, but also functions like a retaining ring to prevent the rotary shaft 223 from separating from the bearing 16.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor bearing heat dissipation structure being applied to a bearing having a bottom surface, comprising:
    a metal base provided with a through hole;
    a heat conducting element including a wall portion fixedly connected at a lower end to the metal base and an extended portion horizontally formed on an upper end of the wall portion; and the extended portion having a free end and a top surface; and
    a plastic bearing cup including a lower portion, which encloses the wall portion of the heat conducting element therein and is fixed to the metal base; the plastic bearing cup upward extending from the lower portion and having an upper end located higher than the wall portion; the plastic bearing cup having an inner wall surface and internally defining a bearing receiving hole, which extends from the upper end of the plastic bearing cup into the lower portion thereof;
    wherein the extended portion of the heat conducting element is extended from the upper end of the wall portion to horizontally radially inward project beyond the inner wall surface of the plastic bearing cup toward a center thereof, so that both the free end and the top surface of the extended portion are located in the bearing receiving hole; and the bearing being accommodated in the bearing receiving hole and seated on the extended portion with the bottom surface of the bearing being in contact with the top surface of the extended portion;
    wherein the through hole of the metal base is located below the heat conducting element and the plastic bearing cup, and a space defined in the heat conducting element between an underside of the extended portion and an inner side of the wall portion to communicate with the bearing receiving hole in the plastic bearing cup and the through hole of the metal base.

2. The motor bearing heat dissipation structure as claimed in claim 1, wherein the wall portion is configured as a hollow cylinder.

3. The motor bearing heat dissipation structure as claimed in claim 2, wherein the extended portion of the heat conducting element is horizontally extended from the upper end of the wall portion toward a center of the hollow cylinder.

4. The motor bearing heat dissipation structure as claimed in claim 1, wherein a space is defined in the heat conducting element between an underside of the extended portion and an inner side of the wall portion to communicate with the bearing receiving hole in the plastic bearing cup and the through hole on the metal base.

5. The motor bearing heat dissipation structure as claimed in claim 4, further comprising a sealing element being correspondingly closed onto the through hole of the metal base to seal the through hole and a lower open side of the space in the heat conducting element.

6. The motor bearing heat dissipation structure as claimed in claim 4, wherein the wall portion of the heat conducting element is provided with a plurality of circumferentially spaced slots respectively extending from the wall portion to the extended portion; wherein the slots can be configured to cut through or not to cut through a lower end of the wall portion.

7. The motor bearing heat dissipation structure as claimed in claim 6, wherein the lower portion of the plastic bearing cup is partially radially inward extended through the slots into the space in the heat conducting element above the through hole of the metal base, and also forms a sealing end to close the through hole and the space.

8. The motor bearing heat dissipation structure as claimed in claim 1, wherein the wall portion of the heat conducting element is substantially perpendicular to the metal base.

9. The motor bearing heat dissipation structure as claimed in claim 1, wherein the bearing includes an inner cylindrical portion and an outer cylindrical portion, which together define the bottom surface of the bearing between them.

10. The motor bearing heat dissipation structure as claimed in claim 9, wherein the free end of the extended portion of the heat conducting element is located at a position corresponding to the inner cylindrical portion or between the inner cylindrical portion and the outer cylindrical portion.

11. The motor bearing heat dissipation structure as claimed in claim 9, wherein the free end of the extended portion of the heat conducting element is located at a position slightly radially inward protruded beyond the inner cylindrical portion to engage with an annular retaining groove formed on a rotary shaft that is received in the inner cylindrical portion.

12. The motor bearing heat dissipation structure as claimed in claim 1, further comprising a metal bottom plate, on which a first opening is provided; the metal base being located in the first opening and connected to the metal bottom plate via a plurality of connection aims; the connection arms respectively having an end connected to an outer periphery of the metal base and another opposite end connected to an inner periphery of the first opening, so as to support the metal base in the first opening.

13. The motor bearing heat dissipation structure as claimed in claim 12, wherein the metal bottom plate includes a frame portion extended along an outer edge thereof, such that a second opening is formed on one side of the metal bottom plate between two ends of the frame portion.

14. The motor bearing heat dissipation structure as claimed in claim 12, wherein the metal bottom plate is made of a material selected from the group consisting of gold, silver, copper, aluminum, and iron, and any combination thereof.

15. The motor bearing heat dissipation structure as claimed in claim 1, wherein the metal base and the heat conducting element are made of a material selected from the group consisting of gold, silver, copper, aluminum, and iron, and any combination thereof.

16. A fan, comprising:
a metal base provided with a through hole;
a heat conducting element including a wall portion fixedly connected at a lower end to the metal base and an extended portion horizontally formed on an upper end of the wall portion; and the extended portion having a free end and a top surface;
a plastic bearing cup including a lower portion, which encloses the wall portion of the heat conducting element therein and is fixed to the metal base; the plastic bearing cup upward extending from the lower portion and having an upper end located higher than the wall portion; the plastic bearing cup having an inner wall surface and internally defining a bearing receiving hole, which extends from the upper end of the plastic bearing cup into the lower portion thereof;
a stator assembly being fitted on around an outer side of the plastic bearing cup;
a bearing being received in the bearing receiving hole of the plastic bearing cup, and having a central bore and a bottom surface;
a rotor assembly being correspondingly located around the stator assembly and including a rotary shaft, which extends through the central bore of the bearing;
wherein the extended portion of the heat conducting element is extended from the upper end of the wall portion to horizontally radially inward project beyond the inner wall surface of the plastic bearing cup toward a center thereof, so that both the free end and the top surface of the extended portion are located in the bearing receiving hole; and
wherein the bearing is seated on the extended portion with the bottom surface thereof being in contact with the top surface of the extended portion;
wherein the through hole of the metal base is located below the heat conducting element and the plastic bearing cup, and a space defined in the heat conducting element between an underside of the extended portion and an inner side of the wall portion to communicate with the bearing receiving hole in the plastic bearing cup and the through hole of the metal base.

17. The fan as claimed in claim 16, wherein an end of the rotary shaft that is extended through the bearing is provided with an annular retaining groove.

18. The fan as claimed in claim 17, wherein the free end of the extended portion of the heat conducting element is extended into and engaged with the annular retaining groove formed on the rotary shaft.

19. The fan as claimed in claim 17, further comprising a retaining ring set in the annular retaining groove.

20. The fan as claimed in claim 16, wherein the free end of the extended portion of the heat conducting element is extended to a position corresponding to the inner cylindrical portion or between the inner cylindrical portion and the outer cylindrical portion.

* * * * *